(12) United States Patent
Walia et al.

(10) Patent No.: US 9,687,059 B2
(45) Date of Patent: Jun. 27, 2017

(54) NAIL DECORATING APPARATUS

(71) Applicant: Preemadonna Inc., Menlo Park, CA (US)

(72) Inventors: Herpreet Walia, Menlo Park, CA (US); Deepak Boggavarapu, San Carlos, CA (US); Janet Peterson, Larkspur, CA (US); Casey Schulz, San Jose, CA (US); Peter Peterson, Larkspur, CA (US)

(73) Assignee: PREEMADONNA INC., Menlo Park, CA (US)

( * ) Notice: Subject to any disclaimer, the term of this patent is extended or adjusted under 35 U.S.C. 154(b) by 0 days.

(21) Appl. No.: 14/468,239

(22) Filed: Aug. 25, 2014

(65) Prior Publication Data

US 2016/0345708 A1 Dec. 1, 2016

Related U.S. Application Data

(60) Provisional application No. 62/028,233, filed on Jul. 23, 2014, provisional application No. 61/869,611, filed on Aug. 23, 2013.

(51) Int. Cl.
*A45D 29/00* (2006.01)
*A45D 29/22* (2006.01)
(Continued)

(52) U.S. Cl.
CPC ............. *A45D 29/22* (2013.01); *A45D 29/00* (2013.01); *A45D 34/042* (2013.01);
(Continued)

(58) Field of Classification Search
CPC ........ A45D 29/00; A45D 29/18; A45D 29/22; A45D 29/004; A45D 29/11; A45D 29/14;
(Continued)

(56) References Cited

U.S. PATENT DOCUMENTS 1,844,698 A * 2/1932 Snyder .......................... 132/73.5
2,461,695 A * 2/1949 McMahon ....................... 132/73
(Continued)

FOREIGN PATENT DOCUMENTS

| JP | 2012085944 | * | 5/2012 |
| WO | WO2015018987 | * | 2/2015 |

OTHER PUBLICATIONS

International Search Report & Written Opinion for Application No. PCT/US2015/027851, Date of filing: Apr. 17, 2015, Applicant: Preemadonna Inc. Date of Mailing: Oct. 28, 2015.
(Continued)

*Primary Examiner* — Rachel Steitz
(74) *Attorney, Agent, or Firm* — London Bridge Ventures (57) ABSTRACT

Decorating a human nail including: (i) using a positioning aid to place a user's finger beneath a camera; (ii) capturing an image of the user's fingernail; (iii) based on the captured image, determining at least one measurement of the fingernail or finger; (iv) calculating a print area based on the at least one measurement; (v) communicating the print area to the ink jet printer assembly; (vi) placing the user's finger in contact with a touchscreen of the portable electronic device; (vii) detecting that the user's finger is within the print area; and (viii) applying a nail-coating material to the print area.

7 Claims, 13 Drawing Sheets

(51) Int. Cl.
A45D 34/04 (2006.01)
A45D 44/00 (2006.01)
B41J 3/407 (2006.01)

(52) U.S. Cl.
CPC ............ A45D 44/005 (2013.01); B41J 3/407 (2013.01); *A45D 2029/005* (2013.01); *A45D 2044/007* (2013.01); *B41J 3/4073* (2013.01)

(58) Field of Classification Search
CPC ........ A45D 2029/002; A45D 2029/004; A45D 2029/005
USPC ....... 132/73, 200, 73.5, 75.3, 285, 319, 333; 248/637, 644, 671, 158, 676–678, 121, 248/124.1, 125.1, 127, 176.1, 639, 118.3, 248/122.1; 211/7, 13.1, 22, 100, 123, 211/71.01, 196, 205, 125.7; 347/1, 2, 3, 347/4; 700/161; 348/77
See application file for complete search history.

(56) References Cited

U.S. PATENT DOCUMENTS

| | | | | |
|---|---|---|---|---|
| 3,130,734 | A * | 4/1964 | Ellis et al. | |
| D277,323 | S * | 1/1985 | Raicevic | |
| D299,559 | S * | 1/1989 | Wong | |
| 4,864,966 | A * | 9/1989 | Anderson et al. | |
| 4,910,661 | A * | 3/1990 | Barth et al. | |
| 4,915,331 | A * | 4/1990 | Becker et al. | 248/118 |
| 4,937,676 | A * | 6/1990 | Finelli et al. | 348/375 |
| 5,668,930 | A * | 9/1997 | Hamura et al. | |
| 5,746,334 | A * | 5/1998 | Brandenberg | 211/205 |
| 5,906,284 | A * | 5/1999 | Hammerstrom et al. | 211/205 |
| 6,035,860 | A * | 3/2000 | Mombourquette | 132/200 |
| 6,067,996 | A * | 5/2000 | Weber et al. | 132/73 |
| 6,229,565 | B1 * | 5/2001 | Bobry | 348/207.99 |
| 6,286,517 | B1 * | 9/2001 | Weber et al. | 132/73 |
| 6,525,724 | B1 * | 2/2003 | Takami | 345/419 |
| D476,509 | S * | 7/2003 | Orsino et al. | D6/477 |
| 6,919,927 | B1 * | 7/2005 | Hyodo | 348/333.02 |
| 6,940,541 | B1 * | 9/2005 | Small | 348/207.2 |
| 6,986,442 | B2 * | 1/2006 | Engel et al. | 222/63 |
| 7,123,983 | B2 * | 10/2006 | Yogo et al. | 700/182 |
| 7,193,734 | B2 * | 3/2007 | Silverbrook et al. | 358/1.1 |
| 7,246,780 | B2 * | 7/2007 | Oddsen, Jr. | 248/282.1 |
| 7,290,550 | B2 * | 11/2007 | Sim | 132/73 |
| 7,450,105 | B2 * | 11/2008 | Nakamura et al. | 345/104 |
| 7,798,061 | B2 * | 9/2010 | Dilou | 101/127.1 |
| 8,262,053 | B1 * | 9/2012 | Zhao | 248/676 |
| D686,369 | S * | 7/2013 | Horvath | |
| 8,646,898 | B2 * | 2/2014 | Bitoh | 347/101 |
| 8,681,359 | B2 * | 3/2014 | Bitoh | 358/1.15 |
| 8,695,495 | B2 * | 4/2014 | Hashimoto | 101/35 |
| D705,488 | S * | 5/2014 | Cheng | |
| 8,840,206 | B2 * | 9/2014 | Hashimoto | 347/2 |
| 8,919,898 | B2 * | 12/2014 | Yamasaki | 347/2 |
| 8,928,607 | B1 * | 1/2015 | Spackman | 345/173 |
| 1,478,201 | A1 * | 10/2016 | Legallais | |
| 9,475,308 | B2 * | 10/2016 | Legallais | |
| 2004/0056958 | A1 * | 3/2004 | Lee | 348/207.1 |
| 2004/0094176 | A1 * | 5/2004 | Daoting | |
| 2005/0041018 | A1 * | 2/2005 | Philipp | |
| 2005/0174367 | A1 * | 8/2005 | Kondo et al. | 347/3 |
| 2007/0092634 | A1 * | 4/2007 | Zhang | 427/1 |
| 2008/0308687 | A1 * | 12/2008 | Terry | 248/122.1 |
| 2009/0153604 | A1 * | 6/2009 | Chen et al. | |
| 2009/0277470 | A1 * | 11/2009 | Mitchell et al. | 132/285 |
| 2010/0053151 | A1 * | 3/2010 | Marti et al. | 345/419 |
| 2010/0091104 | A1 * | 4/2010 | Sprigle et al. | 348/136 |
| 2012/0103210 | A1 * | 5/2012 | Hashimoto | |
| 2012/0113171 | A1 * | 5/2012 | Murata | 347/2 |
| 2012/0170293 | A1 * | 7/2012 | Terry | 362/431 |
| 2012/0274683 | A1 * | 11/2012 | Yamasaki | 347/2 |
| 2012/0281080 | A1 * | 11/2012 | Wang | 348/77 |
| 2013/0038648 | A1 * | 2/2013 | Kasahara | 347/2 |
| 2013/0057581 | A1 * | 3/2013 | Meier | 345/633 |
| 2013/0106928 | A1 * | 5/2013 | Lee | 347/2 |
| 2013/0175413 | A1 * | 7/2013 | Waugh | 248/124.1 |
| 2013/0216295 | A1 * | 8/2013 | Wong | |
| 2013/0235137 | A1 * | 9/2013 | Nakayama | |
| 2013/0242019 | A1 * | 9/2013 | Bitoh | 347/104 |
| 2013/0274907 | A1 * | 10/2013 | Carbonera et al. | |
| 2014/0070059 | A1 * | 3/2014 | Vieira | 248/122.1 |
| 2014/0161507 | A1 * | 6/2014 | Wong | |
| 2014/0300722 | A1 * | 10/2014 | Garcia | 348/77 |
| 2015/0007841 | A1 * | 1/2015 | Yamasaki | 132/73.5 |
| 2015/0029382 | A1 * | 1/2015 | Chun et al. | 348/333.03 |
| 2015/0182001 | A1 * | 7/2015 | Yi | |
| 2015/0335131 | A1 * | 11/2015 | Ortiz | |
| 2016/0183657 | A1 * | 6/2016 | Nagao | |

OTHER PUBLICATIONS

Google Internet search for 'nail printing machine' date restricted prior to Apr. 26, 2014, 4 pages.

* cited by examiner

NAIL DECORATING APPARATUS

CROSS REFERENCE TO RELATED APPLICATIONS

This application claims the benefit of priority to U.S. Provisional Application Ser. No. 61/869,611, filed on Aug. 23, 2013, and Ser. No. 62/028,233 filed on Jul. 23, 2014, the contents of which are incorporated herein by reference in their entirety.

FIELD OF INVENTION

The present invention is directed to an apparatus for, and methods of, applying a nail-covering material to human nails.

SUMMARY OF THE INVENTION

A method of decorating a human nail comprising the steps of: (i) placing a user's finger in a positioning aid for orienting the user's finger below a photographic lens of a camera; (ii) capturing and recording an image of a user's finger with the camera on a portable electronic device, the image including a portion the user's nail; (iii) based on the image of the user's finger, determining at least one measurement selected from the group consisting of (a) the width of the user's finger, (b) the width of the user's nail and (c) the length of the user's nail; (iv) calculating a print area based on the at least one measurement in step (iii); (v) communicating the print area to the ink jet printer assembly; (vi) placing the user's finger in contact with the touch screen of the portable electronic device; (vii) detecting that the user's finger is within the print area; and (viii) applying a nail-coating material to the print area.

DESCRIPTION OF THE FIGURES

FIG. 8 illustrates audio/visual cues on the touch screen guiding a user. (a) shows the user launching an app that is installed on the portable electronic device. The App provides an audio/visual cue to the user, for example "Turn it up!", and then further instructs the user to "swipe" her finger to a line displayed on the touchscreen. (b) illustrates a user contacting the touch screen of the portable electronic device and moving her finger to a pre-defined location (center line) on the touch screen, thereby starting application of nail-covering material to the nail. (c) After the finger is placed on the pre-defined location, the App provides a second audio/visual cue, for example by displaying the text "Let's Paint".

DETAILED DESCRIPTION OF THE INVENTION

Figure 1:
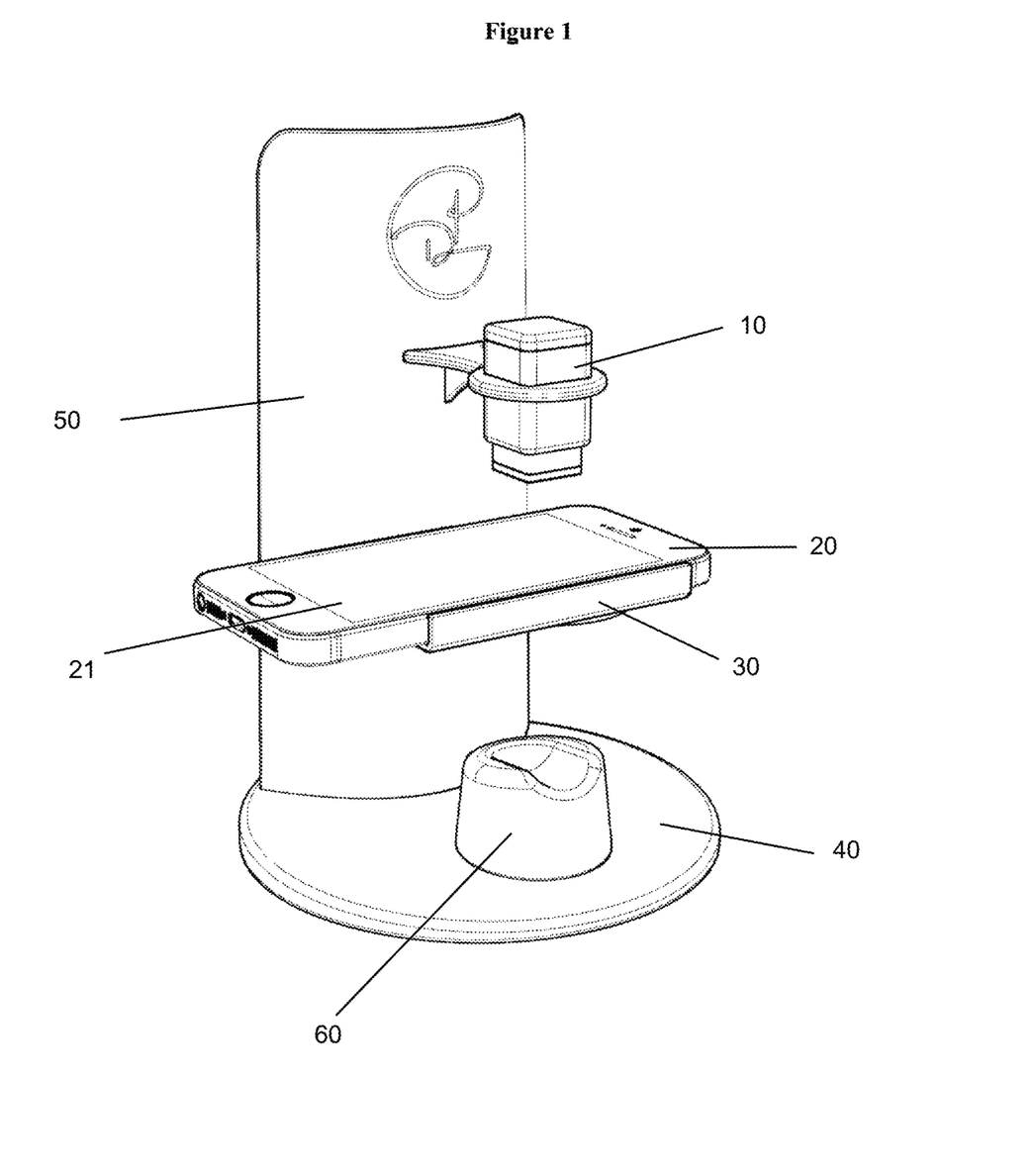
FIG. 1 shows an embodiment of the nail decorating apparatus of the present invention comprising an ink jet printer assembly [10], a portable electronic device [20] having a touch-sensitive display [21] and an imaging system having a camera with at least one photographic lens, a cradle for the portable electronic device [30], a base stage [40], a vertical stand member [50], and a positioning aid [60] for orienting a user's finger to a predetermined location below the photographic lens.
Figure 2:
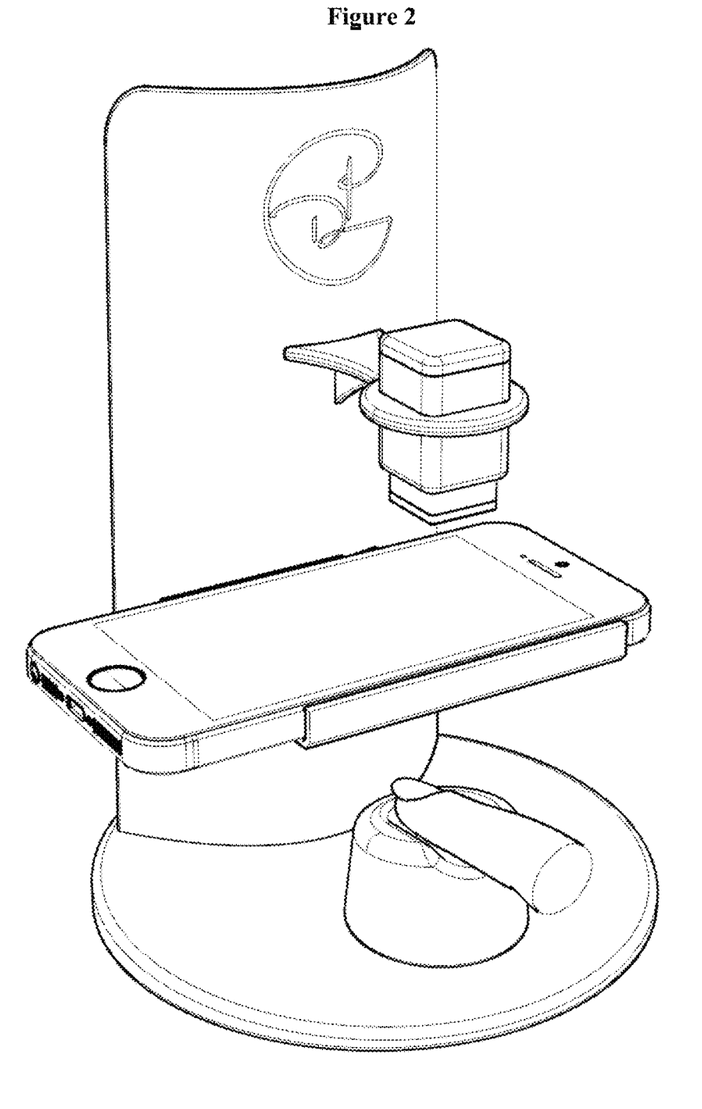
FIG. 2 shows a user's finger on a single-finger positioning aid.
Figure 3:
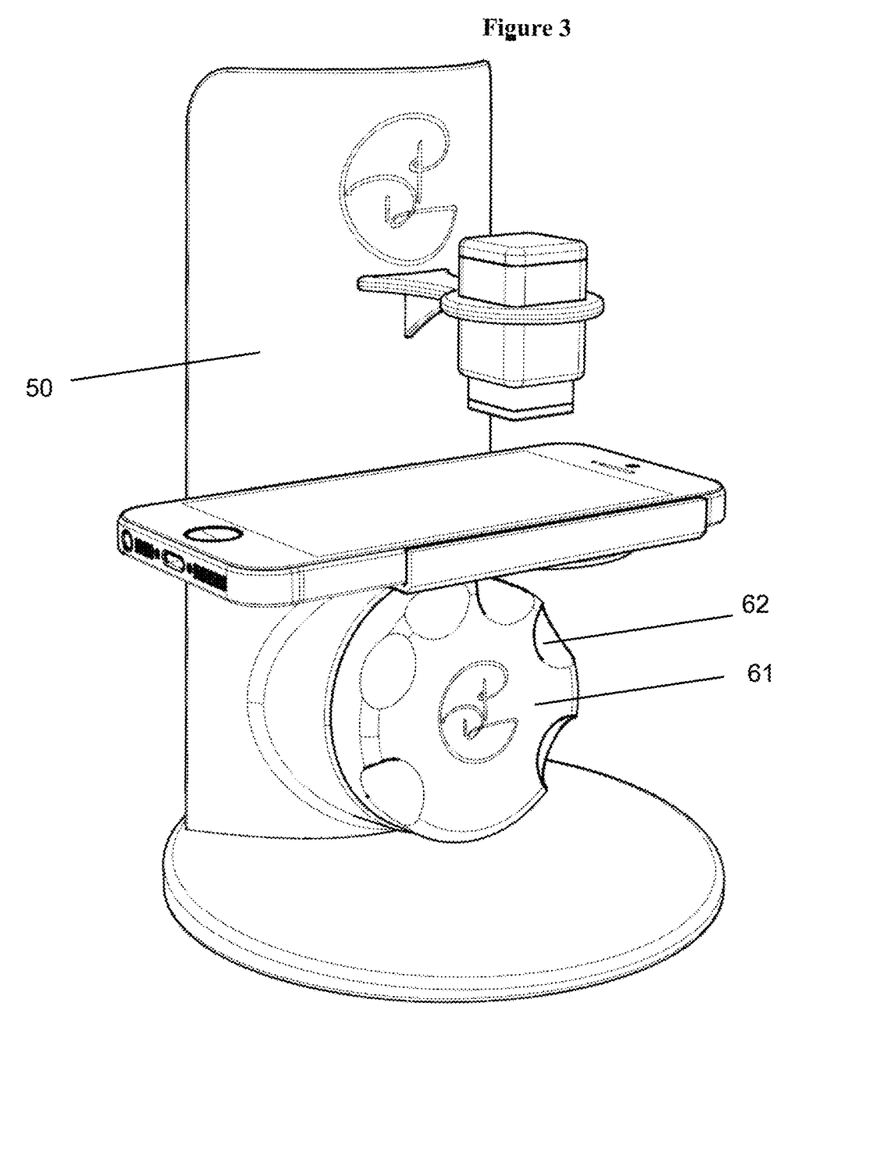
FIG. 3 shows an embodiment of the nail decorating apparatus of the present invention where a positioning aid [61] is attached to a vertical stand member [50]. The positioning aid is aligned vertically, parallel to the vertical stand member, and perpendicular to the cradle. The positioning aid has five indentations/groves [62] that are configured to hold each of the five fingers on a user's hand in a predetermined location below a photographic lens on a portable electronic device.
Figure 4:
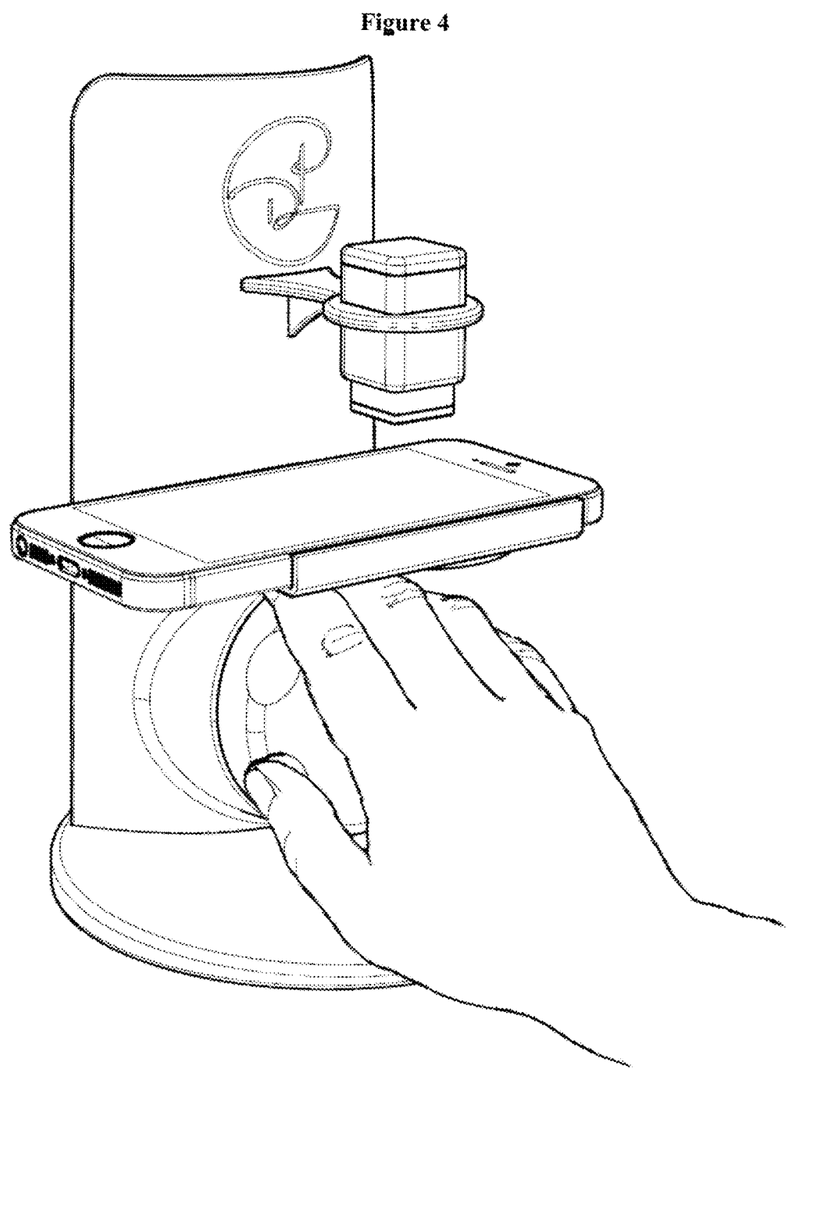
FIG. 4 shows a user's hand oriented in a first position on the positioning aid described in FIG. 3.
Figure 5:
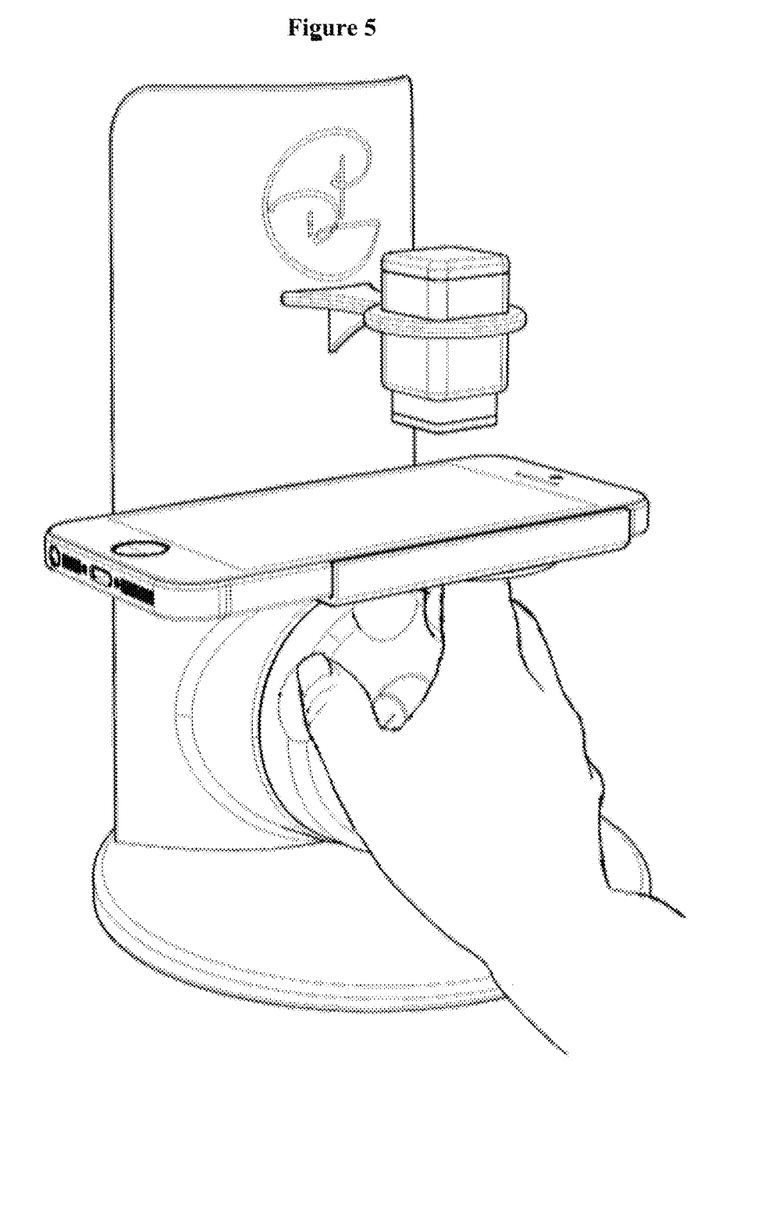
FIG. 5 shows a user's hand oriented in a second position on the positioning aid described in FIG. 3.
Figure 6:
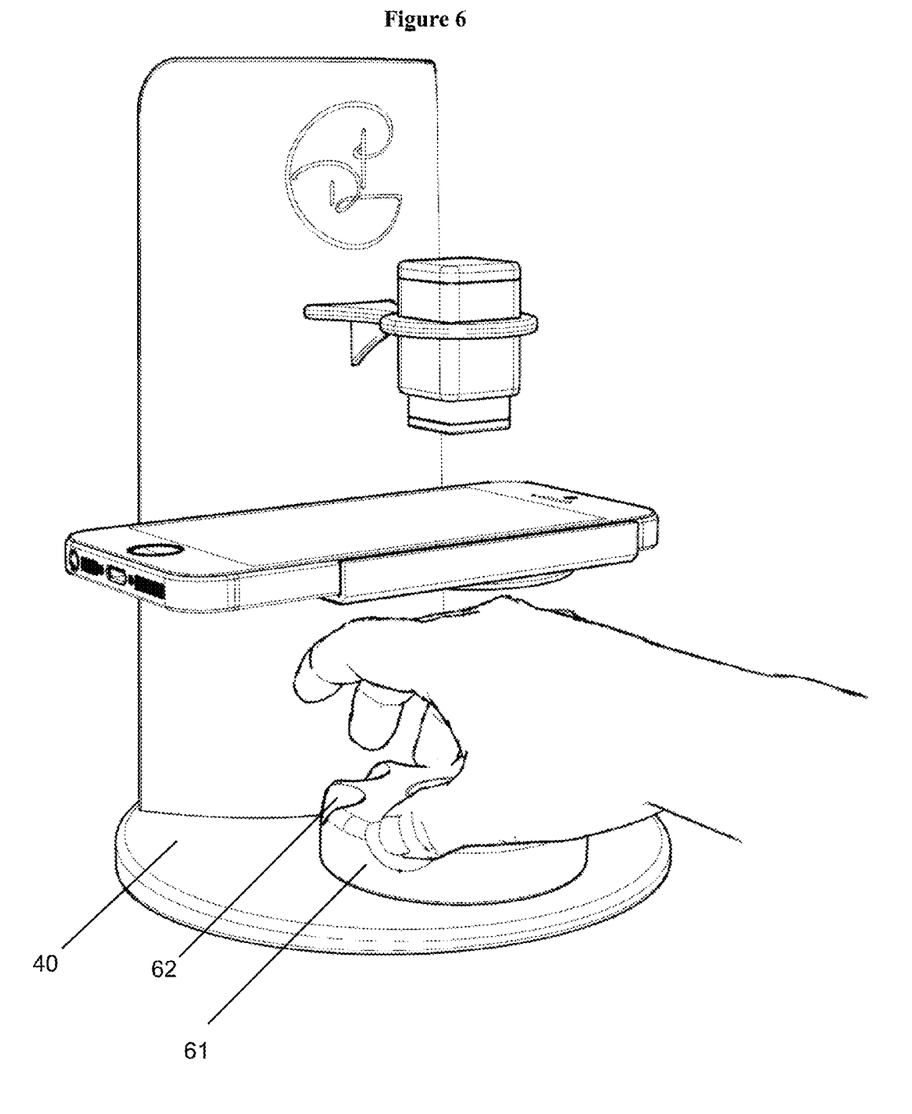
FIG. 6 shows an embodiment of the nail decorating apparatus of the present invention where a positioning aid [61] is attached to the base stage [40]. The positioning aid is aligned horizontally on the base stage, and is below and parallel to the cradle. The positioning aid has five indentations/groves [62] that are configured to hold each of the five fingers on a user's hand in a predetermined location below the photographic lens on a portable electronic device.
Figure 7:
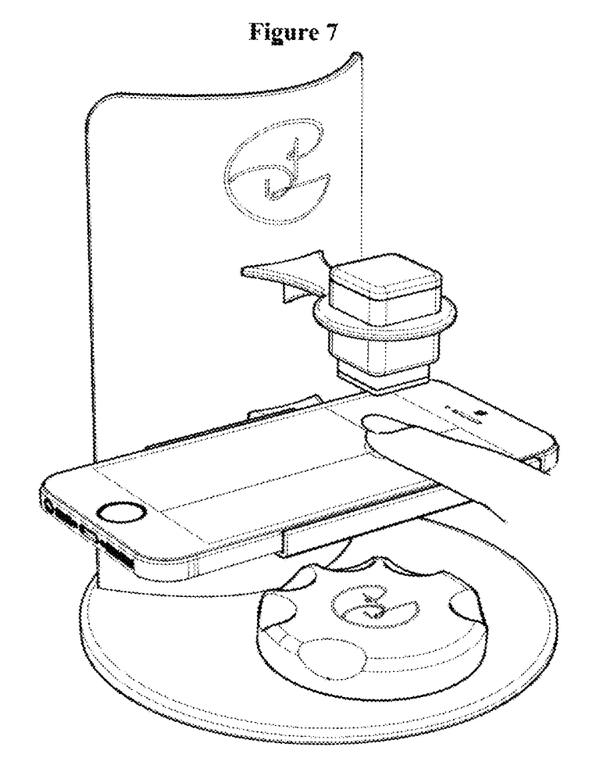
FIG. 7 shows the positional aid described in FIG. 6, and a user's finger in contact with the touch screen aligned with a crosshair projected downward from the ink jet printer assembly.
Figure 8:
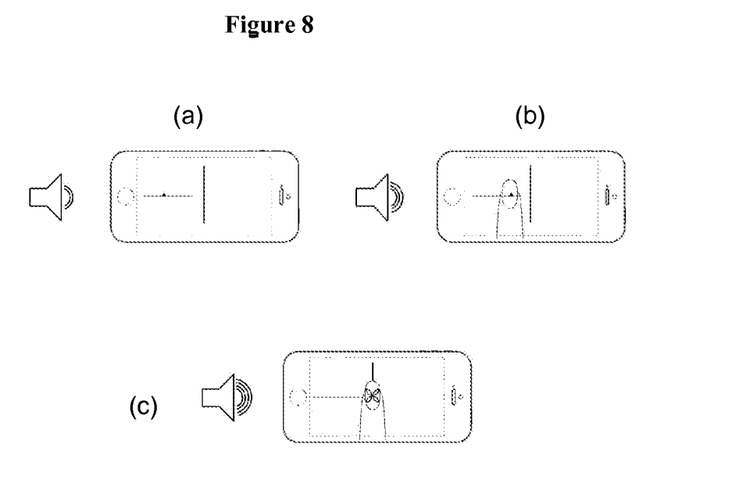
Figure 9:
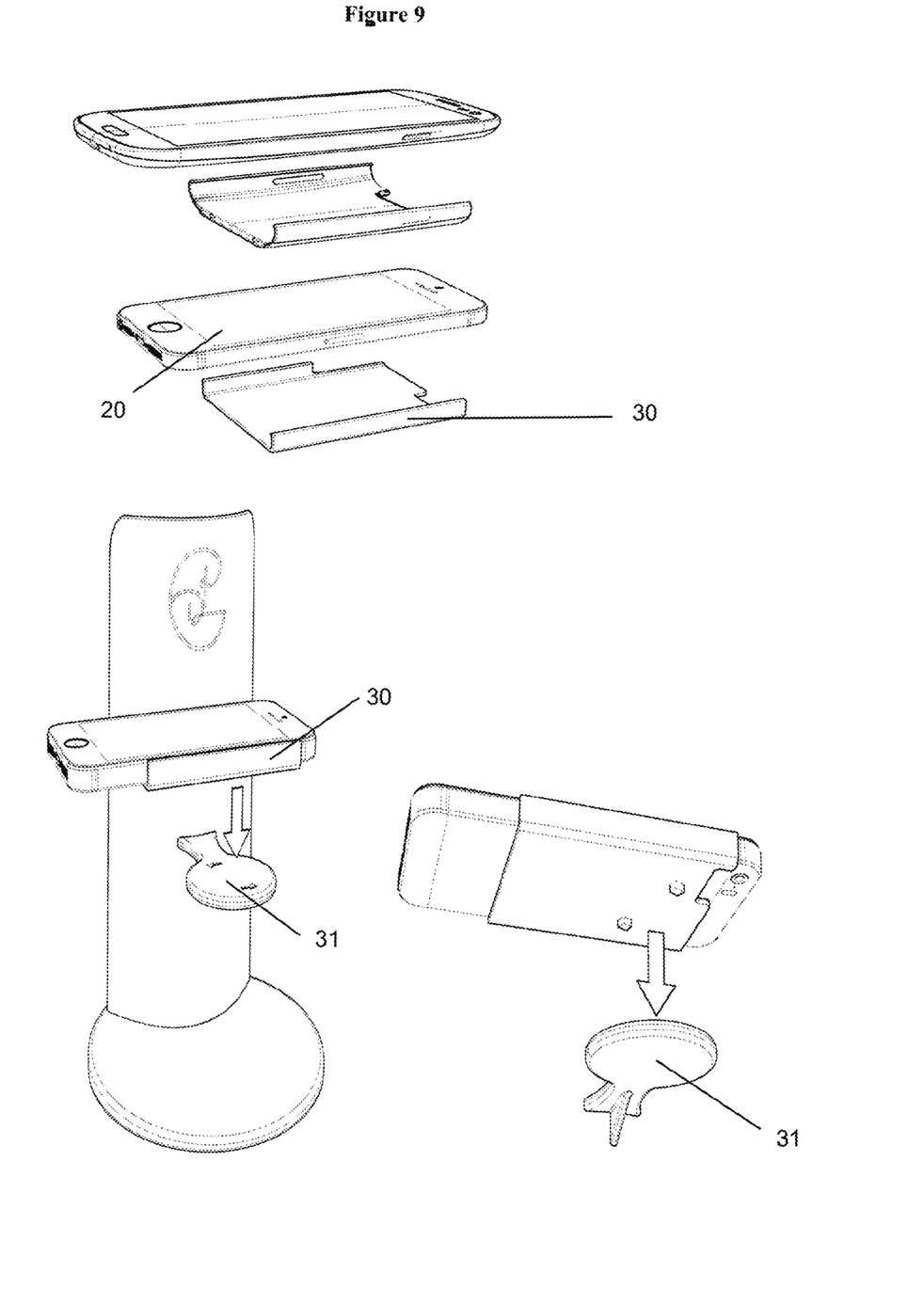
FIG. 9 shows an exploded view of the portable electronic device [20], a cradle [30] for the portable electronic device, and a platform [31] attached to the vertical stand member to which the cradle is attached.
Figure 10:
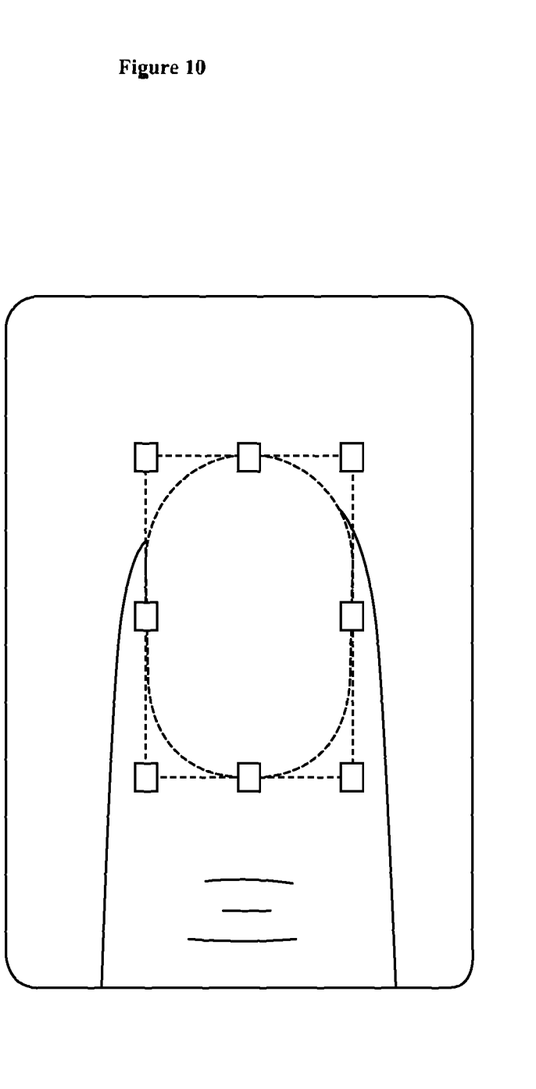
FIG. 10 shows an image of a user's finger and nail with the nail perimeter outlined on the app.
Figure 11:
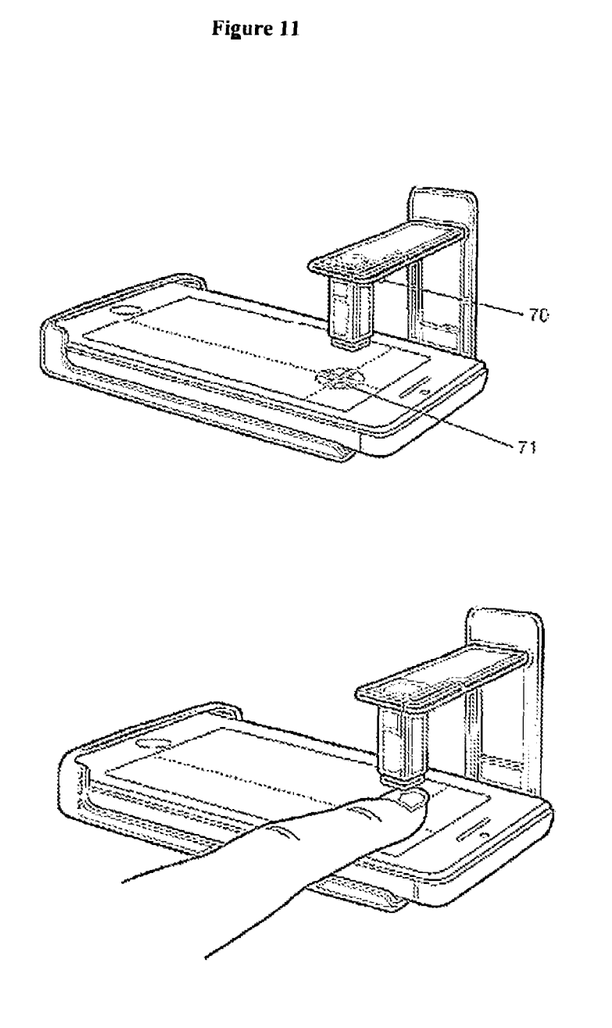
FIG. 11 shows a light source [70] projecting a crosshair [71] downward on to the touch screen.
Figure 12:
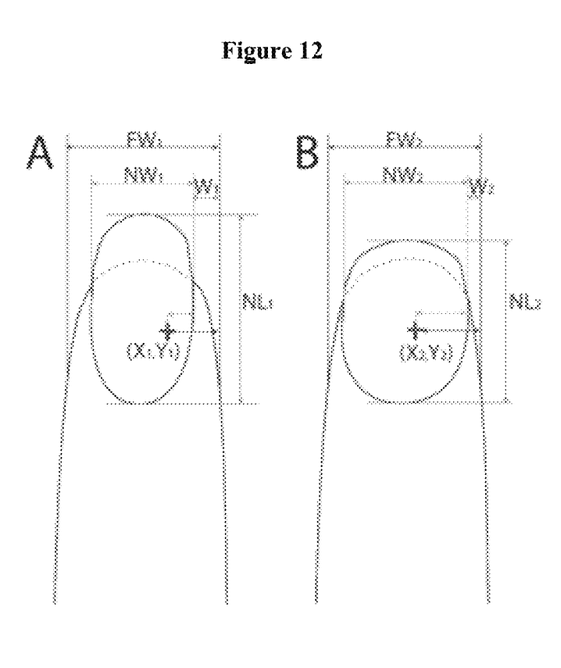
FIG. 12 shows measurements of nail length [NL], nail width [NW] and finger width [FW].
Figure 13:
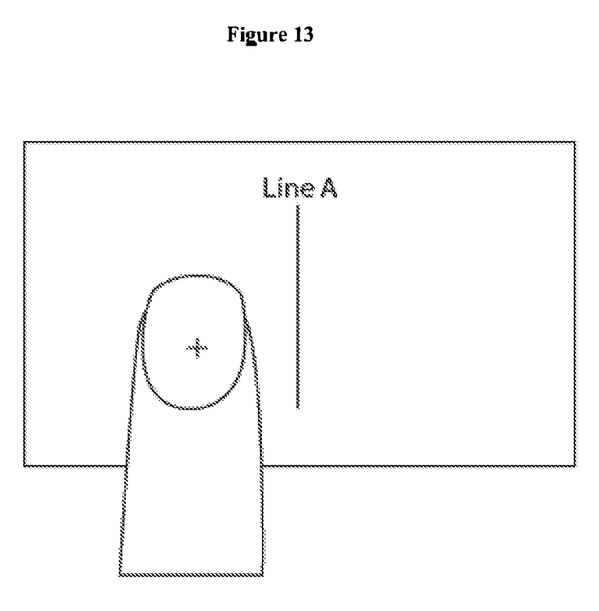
FIG. 13 illustrates a fingernail with a crosshatch on a touch screen displaying a visual cue—a line on to which the user moves/positions the finger to start application of the nail-decorating coating by the ink jet printer assembly.

The methods of the present invention for applying a nail-covering material to human nails are, in certain preferred embodiments, performed using a portable electronic device having two essential components—a touch-sensitive display with a graphical user interface and an imaging system.

The term "human nails" as used in the present application is to be understood to mean the keratogenous membrane that provides a protective plate at the end of the fingers and toes of a human being. Sometimes "human nails" are referred to as "nails" and, in preferred embodiments, "fingernails".

As used in the present application, the term "nail-covering material" is to be understood to mean nail polish/lacquer as well as ink, paint, or similar materials that impart color to the surface of human nails.

A touch screen is an electronic visual display that a user can control, including by touching the screen with one or more fingers. In the context of the present application, the portable electronic device has a screen with a touch-sensitive surface that accepts user input by haptic and/or tactile contact. More particularly, contact, movement, or a break in contact is detected using any of a plurality of touch sensitive technologies known to the skilled artisan, including, but not limited to, capacitive, resistive, infrared, and surface acoustic wave technologies, as well as proximity sensor arrays. The touch screen on the portable electronic device provides visual output to the user via a liquid crystal display, light emitting polymer display, or other display technology known in the art.

In one preferred embodiment, the portable electronic device used in the methods of the present invention has a capacitive touch screen comprised of an insulator (e.g., glass) and a transparent conductor (e.g., indium tin oxide). In this embodiment, a fingertip acts as a conductive material; touching the surface of the screen results in a distortion of the screen's electrostatic field, creating a measurable change in capacitance. Different technologies known in the art may be used to determine the location of a fingertip on the capacitive touch screen. This location is then sent to a controller for processing.

In addition to a touch screen, the portable electronic device used in the methods of the present invention has a touch screen controller, one or more processors, memory (e.g., one or more magnetic disk storage devices, flash memory devices, or other non-volatile solid state memory devices), software (also known as apps), and a means for powering the components of the device.

The portable electronic device used in the methods of the present invention also has modular sets of instructions that are stored in the memory for execution by one or more processors for detecting contact with the touch-sensitive screen, displaying graphics, providing a graphical user interface, processing images, determining the perimeter of a nail, calculating a print area (as defined below), storing a plurality of nail art (as defined below) and communicating with an ink jet printer assembly.

Contact, movement or a break in contact with the touch screen is detected and processed by a contact module that includes software components for determining that (a) contact has occurred, (b) contact is being maintained, (c) movement of the point of contact has occurred, and if so, tracking that movement, and (d) contact has been broken (i.e., contact has ceased). Determining movement of the point of contact may include determining changes in the magnitude and/or direction of the point of contact. The contact module converts information relating to the point of contact into electrical signals that are processed and displayed on the touch screen as well as communicated to the ink jet printer assembly.

In preferred embodiments, the portable electronic device has a wireless communication function that provides a means for communicating with an ink jet print assembly (or other means for applying a nail-coating material). The portable electronic device may be communicatively attached (e.g., via an electrical connector) to a controller that in turn communicates with the ink jet printer assembly.

The imaging system that is an essential part of the portable electronic device is capable of acquiring at least one image of a nail to be decorated, and has a camera with at least one photographic lens. In preferred embodiments, the camera has a plurality of photographic lens arranged along a common axis.

In an especially preferred embodiment, the portable electronic device has at least one speaker for providing one or more audio cues to the user.

The portable electronic device is received and held in a cradle positioned below an upper arm having an ink jet printer assembly. By "received" is meant "slid" or "snapped into" or otherwise "attached to". The cradle can be affixed directly to the nail decorating apparatus of the present invention or to a platform on the nail decorating apparatus.

A vertical stand member connects the cradle and the upper arm/ink jet printer assembly.

In a preferred embodiment, the cradle is positioned below an upper arm having an ink jet printer assembly and above a base stage that is configured at a fixed distance from the camera to provide optimal and repeatable positioning of a fingernail during image acquisition. In this embodiment, a vertical stand member connects the cradle, the upper arm and the base stage.

The base stage can have, and preferably does have, a positioning aid for orienting at least one finger (and its fingernail) to a predetermined location below the photographic lens.

In certain embodiments, the positioning aid is attached directly to the nail decorating apparatus of the present invention. In other embodiments, the positioning aid is separate from the device and is placed below the camera/cradle.

In a first embodiment, the positioning aid is configured to hold an individual finger in a predetermined location below the photographic lens.

In a second embodiment, the positioning aid is configured to hold each of the five fingers on a user's hand in a predetermined location below the photographic lens.

In one preferred aspect of the second embodiment, the positioning aid is a dial that can be turned/twisted by a user to five different positions. The dial can be positioned horizontally or vertically in relation to the cradle/camera.

The camera can, and preferably does have, at least one flash unit for illuminating the nail.

In a preferred embodiment, the cradle is above a base stage that has one or more light sources, apart from the flash unit on the camera.

The ink jet printer assembly used in the nail decorating apparatus of the present invention is a micro-electronic device comprised of a printhead having a plurality of ink nozzles and integrated circuits that route signals to the ink nozzles, controlling the formation and release of ink droplets. At least one ink color—and preferably, a plurality of ink colors—is/are stored in one or more separate ink reservoir(s) within the ink jet printer assembly. Ink nozzles are connected to ink color reservoir(s) and are configured in a series of chambers that produce ink droplets "on demand" by thermal or piezoelectric means known in the art. In general, a pulse of electric current passes through a heating element within each chamber, causing ink in the chamber to rapidly vaporize and form a bubble. The resulting increase in pressure within the chamber propels tiny ink droplets through the nozzle onto the nail.

In preferred embodiments, the ink jet printer assembly is comprised of inks having a plurality of colors. As used in the present invention, the term "color" is to be understood to mean cyan, magenta, yellow, black, and white and combinations and shades thereof.

In the first step of the methods of the present invention—image acquisition—a user places a portable electronic device in a cradle.

In a preferred embodiment, the cradle/camera is above the base stage of the nail-decorating device. In this preferred embodiment, the user places at least one finger on the base stage, and captures/records at least image (i.e., takes at least one photograph) of a fingernail using the camera on the portable electronic device. In certain embodiments, the user may take a plurality of images of the fingernail—either as a "burst" of individual frames or as a video clip.

In one embodiment, the cradle has a device for projecting a crosshair, two lines crossing at right angles, or another geometrical shape (e.g., circle, triangle, square), downward onto the base stage.

In one aspect of this embodiment, the user orients the nail such that the crosshair is positioned, preferably centered, on top of the nail.

In another aspect of this embodiment, the user orients the nail such that a geometrical shape is positioned on top of the nail and takes at least one photograph of a fingernail using the camera on the portable electronic device.

In another embodiment, the base stage has a positioning aid that is configured to hold an individual finger in a predetermined location below the photographic lens. The user places a finger in the positioning aid and takes at least one photograph of the nail of that finger using the camera on the portable electronic device.

In yet another embodiment, the base stage has a positioning aid that is configured to simultaneously hold each of the five fingers on a user's hand in a predetermined location below to the photographic lens. The user places a hand in the positioning aid and takes at least one photograph of a fingernail using the camera on the portable electronic device.

The positioning aid for simultaneously holding each of the five fingers on a user's hand may be a dial that is positioned vertically or horizontally below the cradle.

In the horizontal embodiment, the positioning aid is preferably attached to the base stage.

In the vertical embodiment, the positioning aid is preferably attached to the vertical stand member.

The user turns/twists or otherwise orients the dial to one of five different positions and takes at least one photograph of a nail to be decorated using the camera on the portable electronic device.

In a second step of the methods of the present invention, at least one image of a nail from the first step is analyzed using software (an app) that is installed on the portable electronic device. The user runs the app, which overlays an X,Y grid over the image of the nail to be decorated, and calculates the following values: finger width (FW); nail width (NW); nail length (NL). The app applies an edge detection algorithm to FW, NW and NL to determine (a) an outline (perimeter) of the finger and/or (b) an outline (perimeter) of the area on the nail on the finger from (a) to be decorated. The surface of the nail to be decorated, which can be the entire nail or a portion of the nail, is referred to in the present application as the "print area".

In the third step of the methods of the present invention—application of a nail covering material to a nail that has been imaged and for which a print area has been determined—the user performs a predefined gesture, and the touch-sensitive screen detects contact between a predefined application area on the touch screen display and the fingertip (the fleshy portion of the distal phalanx of a finger).

As used in the present application, the term "gesture" is to be understood to mean an initial point of contact between the fingertip and the touch screen, movement of the fingertip from the initial point of contact (e.g., along a predefined path) while maintaining continuous contact with the touch screen, and a breaking of contact between the fingertip and the touch screen (to complete the gesture).

In one embodiment, an outline of the perimeter of the user's finger is displayed on the touch screen. The user places the finger within the outlined area. The app detects the finger, or portion of the finger, as being within the outlined area and sends instructions to the ink jet printer assembly to apply the nail-coating material to the print area.

In one embodiment, the arm has a device for projecting a crosshair, two lines crossing at right angles, or other geometrical shape (e.g., circle, triangle, square) downward onto the touch screen.

In one aspect of this embodiment, the user orients the nail such that the crosshair is positioned, preferably centered, on top of the nail.

In another aspect of this embodiment, the user orients the nail such that an outline of the perimeter of the fingernail is positioned on top of the nail. The user then takes at least one photograph of a fingernail using the camera on the portable electronic device.

In certain embodiments, the ink jet print head is configured with a number of nozzles such that the user does not need to move the finger in order for the nail-coating material to be applied to cover or coat the print area.

In other embodiments, the ink jet print head is configured with a number of nozzles such that in order for the nail-coating material to be applied to the entire print area, the finger/nail must be moved from a starting position to a completion position.

In accordance with this embodiment, the user may move a graphical user interface (GUI) object from a predefined initiation point on the touch-sensitive screen to a predefined completion point on the touch-sensitive screen. In a preferred, but non-limiting example, the user "slides" an indicator along a line segment.

In one aspect of this embodiment, the touch-sensitive screen displays a plurality of predefined, sequential points, including an initiation point, at least one intermediate point, and a completion point. The user moves the GUI object from point to point.

In embodiments in which nail covering is applied to a fingernail at a plurality of predefined, sequential points, the user completes a series of gestures, each for a designated time interval.

The touch screen may, and in preferred embodiments, does display visual cues to guide the user to maintain contact with each of the predefined, sequential points for a designated time interval.

In place of, or in addition to one or more visual cues, in certain embodiments the user may be provided with one or more audio cues to maintain contact with the touch screen for a designated time interval. The audio cue(s) are generated via at least one speaker that is preferably a part of the portable electronic device.

In the above embodiments, the nail decorating apparatus begins in a "ready" state. Upon detecting contact between the fingertip and the touch-sensitive display in the predefined application area (e.g., the outline of the finger nail), the nail decorating apparatus transitions to an "application" state. If contact between the fingertip and the touch-sensitive display in the predefined application area is not detected, a signal is sent to the ink jet print assembly to stop printing until such time as contact is restored between the fingertip and the touch-sensitive display in the predefined application area.

In other embodiments, one or more lines are displayed on the touch screen below the intended print area. The user places a finger on top of one or more lines. The touch screen detects the finger and communicates the position of the finger to the app. As needed, the app provides feedback (visual and/or audio cues) to the user to reposition the finger on the touch screen until the nail is oriented in the desired position (i.e., with respect to the one or more lines).

In other embodiments within the scope of the present invention, the portable electronic device having both a touch-sensitive display and an imaging system may be replaced with one or both of a separate touch-sensitive pad (i.e., touch screen) and/or a separate imaging system having a camera with at least one photographic lens. In one such embodiment, the touch screen and imaging system are connected via a main controller that communicates with an ink/paint controller that communicates with an ink/paint dispenser.

In preferred embodiments, methods of the present invention include a further step whereby a user selects nail art. By "nail art" is meant a color, pattern, shape or combination thereof. Non-limiting examples of nail art include images stored in a library on the app or imported into the app by the user from a different source file. The different source file can, for example, be photographs that are separately stored on the portable electronic device.

The invention claimed is:

1. A nail decorating apparatus comprising:
   (a) a portable electronic device having:
      (i) a touch-sensitive display; and
      (ii) an imaging system for acquiring at least one image of a nail to be decorated, the imaging system having a camera with at least one photographic lens;
   (b) a cradle for receiving and holding the portable electronic device below an upper arm;
   (c) an upper arm having an ink jet printer assembly for applying a nail coating material, the ink jet printer assembly; and
   (d) a base stage below the cradle, at a fixed distance from the camera, the base stage having a positioning aid for orienting at least one finger to a predetermined location below the photographic lens;
   wherein the cradle and upper arm are connected by a vertical stand member.

2. The nail decorating apparatus of claim 1 wherein the positioning aid is a dial that can be fixed in at least two positions.

3. The nail decorating apparatus of claim 2 wherein the dial is attached to the base stage and is positioned horizontally below and parallel to, the cradle.

4. The nail decorating apparatus of claim 2 wherein dial is attached to the vertical stand member and is positioned vertically below, and perpendicular to, the cradle.

5. A method of decorating a human nail comprising:
   (i) placing a user's finger in a positioning aid for orienting a user's finger below a photographic lens of a camera;
   (ii) capturing and recording an image of the user's finger with the camera on a portable electronic device, the image including a portion of the user's nail;
   (iii) based on the image of the user's finger, determining at least one measurement selected from the group consisting of (a) the width of the user's finger, (b) the width of the user's nail and (c) the length of the user's nail;
   (iv) calculating a print area based on the at least one measurement in step (iii);
   (v) communicating the print area to an ink jet printer assembly;
   (vi) placing the user's finger in contact with a touch screen of the portable electronic device;
   (vii) detecting that the user's finger is within an application area; and
   (viii) applying a nail-coating material to the print area;
   wherein the method is performed using apparatus comprising a cradle for receiving and holding the portable electronic device below an upper arm, the upper arm having the ink jet printer assembly, wherein the apparatus further comprises a base stage below the cradle at a fixed distance to the camera, the base stage having the positioning aid.

6. The method of claim 5 wherein the print area is calculated based on at least two measurements selected from the group consisting of (a) the width of the user's finger, (b) the width of the user's nail and (c) the length of the user's nail.

7. The method of claim 5 wherein the user receives one or more audio or visual cues to facilitate positioning the user's fingernail in a position below the printhead.

\* \* \* \* \*